United States Patent Office 2,874,809
Patented Feb. 24, 1959

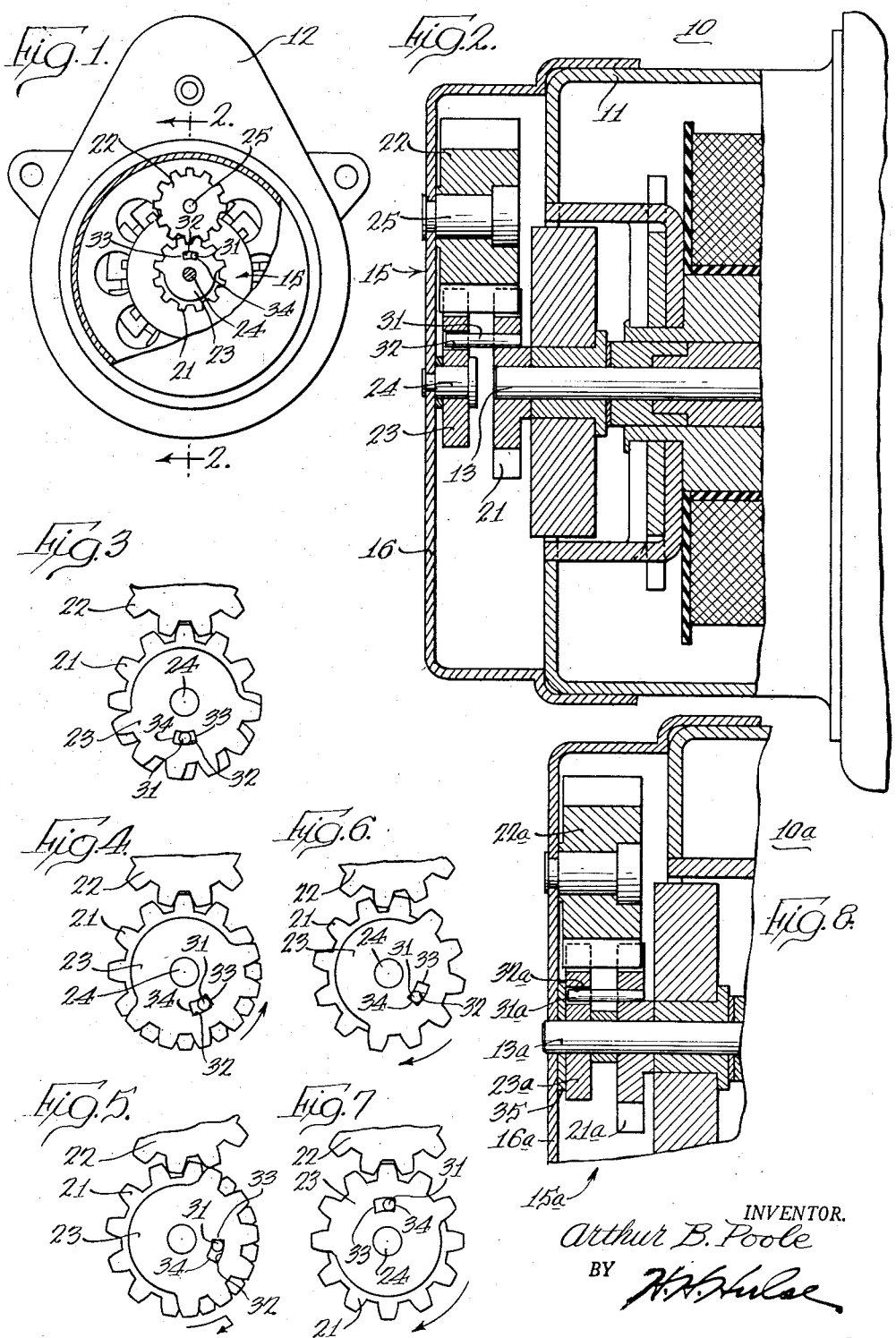

2,874,809

ROTATION CONTROLLING DEVICE

Arthur B. Poole, Harwinton, Conn., assignor, by mesne assignments, to General Time Corporation, New York, N. Y., a corporation of Delaware Application May 17, 1957, Serial No. 659,935

8 Claims. (Cl. 188—82.1)

The present invention relates to rotation controlling means and more particularly to a device for insuring that a self-starting motor capable of rotation in either direction will rotate in the direction desired.

Synchronous A.-C. motors of the type used in clocks and timing devices have extremely low torque capabilities and consequently cannot be used in applications where the work to be done exceeds that required simply to overcome the friction of a gear train. Where steps have been taken to increase the output torque of a clock-type motor, it has generally been true that the increase is brought about at the expense of its unidirectional starting characteristics, so that the resulting motor will start in a random direction depending upon the phasing of the rotor when it comes to rest. Consequently, some means is required to assure uniform starting in the desired direction. Devices of this type have been characterized by the term "no-back" and for convenience this term will be used herein.

Prior "no-back" arrangements have generally been complicated, bulky, and even unreliable in operation. Often they have included a ratchet-like construction which imposes an undesirable load on the motor during its normal operation. It will also be appreciated that motors of the type with which we are here concerned are small and intended for use in compact control devices. Thus, a "no-back" arrangement must be considerably reduced in size for use with these motors in order to both minimize the additional inertia and permit installation within the small space available. Furthermore, it is desirable for the device to be applicable to motors of standard design. And for reasons of economy, a "no-back" device should not include complicated or unusually shaped parts.

It is therefore the general aim of the invention to provide a novel device for effectively insuring rotation of a self-starting motor in a single desired direction which avoids the defects of the prior art devices. It is a further object to provide a device of this type that is reliable, positive in operation and which does not impose a ratcheting, scraping, or other wear and friction producing resistance to normal motor operation. It is a resulting object to provide such a device having a long effective service life.

It is another object to provide a "no-back" device of the type characterized above that is small, compact, and easy to install, requiring no critical adjustments. It is a collateral object to provide such a device that is simple in design and which utilizes conventional, basic elements that can be easily modified as required, thus making it inexpensive to manufacture. It is a more specific object to provide a "no-back" arrangement which utilizes inexpensive pinions having teeth of conventional profile.

It is a further object to provide a device of the above type which is applicable to any standard motor, even those of quite small size, without changing the motor or without requiring any substantial amount of space in the motor housing.

It is also an object to provide a device of the above type that functions properly without regard to the position in which the motor is mounted, or to changes in that position.

It is yet another object to provide a "no-back" arrangement that can be easily altered to restrict rotation of the motor to the opposite direction since it is sufficient to reverse a single element on its supporting shaft without any other change or adjustment whatsoever.

Other objects and advantages of the invention will become apparent upon reading the attached detailed description and upon reference to the drawings in which:

Figure 1 is an elevation view of a typical motor having a "no-back" arrangement installed thereon, with a portion of the housing case broken away.

Fig. 2 is a fragmentary sectional view taken along the line 2—2 in Fig. 1.

Figs. 3 to 7 are fragmentary stop-motion views showing the "no-back" arrangement illustrated in Fig. 1 going through a sequence where the motor rotation is corrected to the desired angular direction.

Fig. 8 is a fragmentary sectional view similar to Fig. 2 showing a modification of the "no-back" arrangement.

While the invention will be described in connection with certain preferred embodiments, it will be understood that I do not intend to limit the invention to those embodiments. On the contrary I intend to cover all alterations, modifications and equivalents as may be included in the spirit and scope of the invention as defined by the appended claims.

Turning now to Figs. 1 and 2, there is shown a self-starting synchronous motor 10 enclosed in a housing 11. In the illustrated embodiment, the motor 10 has an integral gear box 12 through which its driving force is taken. Extending rearwardly from the housing 11, on the side opposite the gear box 12, is a motor shaft 13 which, in the present instance, is an extension of the armature shaft of the motor 10.

In order to control the rotation of the motor 10, a "no-back" device 15 is mounted at the rear of the housing 11 to cooperate with the extending motor output shaft 13. For the purpose of enclosing and providing a mounting plate for the "no-back" device 15, a housing cap 16 is partially telescoped over the rear of the annular housing 11 so as to generally form, in outer configuration, a continuation of that housing.

In accordance with the present invention, the "no-back" arrangement 15 comprises two meshing pinion gears driven by the motor output shaft 13 and a gear segment rotatably mounted concentrically with one of the pinions and adapted to rotate into meshing engagement with the other of the pinions. In addition, a lost motion connection is provided between the segment and the gear concentric therewith for causing the latter to rotate the segment but permitting limited relative rotation, so that upon rotation in one direction the gear teeth of the pinion and the connected segment are in axial alinement while upon rotation in the opposite direction the teeth are axially misalined. With this arrangement, rotation of the motor 10 in the direction in which the gear teeth of the pinion and segment are alined will be permitted, the segment smoothly meshing with the nonconcentric pinion, while rotation in the opposite direction will cause the misalined segment teeth to jam against the pinion teeth, blocking rotation and causing a rebound in the proper direction. It has been found that the force of the rebound is sufficient to cause the motor to begin rotation in the opposite, and desired, direction.

In the present embodiment, a driving pinion 21 is fixed to the motor output shaft 13 and an idler pinion 22 is rotatably mounted in meshing engagement with the driving pinion 21. Rotatably mounted concentric to the driving pinion 21 is a gear segment 23 having a pitch diameter equal to the pitch diameter of the driving pinion 21. Thus, the gear segment 23 may rotate into meshing engagement with the idler pinion 22. In the preferred embodiment, the segment 23 is freely mounted for rotation on a pin 24 which is fastened to the housing cap 16, and thus the segment 23 is free to rotate relative to the driving pinion 21. The idler pinion 22 is rotatably mounted on a pin 25 secured to the housing cap 16.

In order to insure only limited relative movement between the driving pinion 21 and gear segment 23, a pin and slot connection is provided between the two members. In the illustrated embodiment, a pin 31 is mounted eccentrically on the side of the driving gear 21 and extends within an arcuate slot 32 formed in the gear segment 23. It will be understood that when the motor rotates in one direction, the driving gear 21 will carry the pin 31 into engagement with an end 33 of the slot 32 and thereafter rotate the gear segment 23 in unison with the driving gear 21. When the motor 10 rotates in the opposite direction, the pin 31 will engage the opposite end 34 of the slot 32 and the gear segment 23 will be rotated with the driving gear 21 in the opposite direction.

To provide the desired "no-back" action, the ends 33, 34 of the slot 32 are located so that when the pin 31 is in engagement with one of the ends, the teeth of the gear 21 and the segment 23 are axially alined, but when the pin 31 is in engagement with the opposite end of the slot, the teeth of the gear and segment are misalined. In the present instance, the slot 32 is of a length which permits travel of the pin 31 through a distance equal to one and one half times the pitch of the gear teeth of the driving gear 21 and the segment 23. And the slot end 34 is located so that when the pin 31 is in engagement therewith, the teeth of the segment 23 and gear 21 are in axial alinement. Thus, when the motor 10 rotates so that the pin 31 is brought into engagement with the slot end 33, the gear teeth of the segment 23 and the gear 21 will be radially offset one-half of their pitch distance, and thus the sets of gear teeth will be intermediate one another, i. e., in blocking relation.

Briefly reviewing the operation of the "no-back" device 15, and with reference to the Figs. 3–7, the "no-back" device is first shown (Fig. 3) when the motor 10 is deenergized and the pin 31 position, at rest, intermediate the ends of the slot 32. Upon being energized, it will be assumed that the motor 10 begins rotating to drive the gear 21 in a counterclockwise direction which is not the desired direction of rotation.

As the motor rotates the gear 21, the segment 23 tends to lag behind due to its friction and inertia so that prompt bottoming of the pin occurs at the end 33 of the slot (Fig. 4). Following this, both the gear 21 and the segment 23 continue to rotate until the leading tooth on the segment strikes against one of the gear teeth of the idler pinion 22 (Fig. 5). The sudden blockage prevents any further rotation of the armature. However, the armature and the connected gear 21, even in a short space of time, have acquired momentum, and the sudden deceleration causes a substantial force to be transmitted through the pin 31 to the point of impact of the interfering teeth. The resulting rebound transmitted through the pin 31 causes the armature to be impulsed clockwise in the desired direction.

As the motor begins its clockwise rotation, relative movement between the driving pinion 21 and the segment 23 will occur as the pin 31 moves along the slot 32 to engage the slot end 34 (Fig. 6). With the pin 32 in engagement with the slot end 34, the pinion 21 and segment 23 will again rotate in unison, but with their gear teeth in axial alinement. Therefore, when the segment 23 is again brought into engagement with the idler pinion 22 (Fig. 7) their gear teeth will mesh smoothly and the motor 10 will continue to rotate in the desired direction.

It should be noted that when the motor 10 is rotating in the desired direction, clockwise in the illustrated example, there is no frictional resistance to motor rotation imposed by relatively slipping or ratcheting parts. The driving pinion 21, the idler 22 and the segment 23, simply continue to rotate in smooth meshing engagement. Furthermore, it can be seen that the device 15 requires no unusually shaped pieces, and that the gear segment 23 can be simply and economically formed by grinding or otherwise removing a number of teeth from a standard gear of appropriate size.

In Fig. 8 is shown a modification of the "no-back" device embodying the invention and in which parts similar to those described above have been given identical numerals with the distinguishing suffix "a" added.

In this modification, the motor output shaft 13a extends outwardly to the wall of the housing cap 16a, and both the driving pinion 21a and the gear segment 23a are supported on the shaft 13a. The driving gear 21a is fixed to the shaft 13a so as to rotate therewith, while the gear segment 23a is loosely fitted on the shaft so as to permit the required relative rotation between the gear segment 23a and the driving gear 21a. As in the embodiment above described, both the gear segment and the driving gear mesh into engagement with an idler gear 22a, and a pin 31a and slot 32a connection is provided between the gear 21a and segment 23a.

It will be appreciated that the rotation of the shaft 13a within the loosely mounted gear segment 23a will inherently, through friction, tend to rotate the gear segment 23a in the direction in which the shaft 13a is rotating. To insure that the gear segment 23a only rotates when the pin 31a is in engagement with an end of the slot 32a, a frictional resistance is created between the gear segment 23a and the wall of the housing cap 16a. In the illustrated embodiment, this is achieved by sandwiching a relatively large washer 35 between the gear segment and the wall of the housing cap. The washer 35 functions to exert a light frictional restraint against rotation of the gear segment 23a while keeping the segment properly spaced from the wall of the housing cap 16a. In this way, the required slight frictional resistance between the washer 35 and the segment 23a is provided, but the segment is prevented from flatly rubbing against the wall of the housing 16a. Thus, the actual frictional resistance to normal rotation of the motor 10 is almost negligible. The operation of the embodiment shown in Fig. 8 is identical to that discussed above in connection with Figs. 4–7.

It is a feature of the invention that the "no-back" device 15 can be simply and easily modified to reverse the permissible direction of rotation of the motor 10. This can be simply accomplished by reversing the gear segment 23 on its supporting shaft 24, which of course changes the positions of the slot ends 33, 34 with relation to the pin 31 and the driving gear 21. With gear segment 23 reversed, rotation of the driving gear 21 in a counterclockwise direction in Fig. 4 brings the pin 31 into engagement with the pin end 34. This causes the teeth of the gear segment 23 and the driving gear 21 to be in axial alinement and permits the motor to continue rotation in that direction. However, if the motor 10 were to begin rotation in a clockwise direction, the pin 31 would be carried into engagement with the slot end 33, whereupon the teeth of gear 21 and segment 23 would become misalined, and the segment 23 would jam against the idler gear 22, with the resulting rebound reversing the direction of rotation of the motor armature.

Reversal of the gear segment, so as to reverse the permissible direction of rotation of the motor 10, is particularly easy in the embodiment of the invention shown in Fig. 8. In this case it is sufficient to remove the housing cap 16a, so as to free the end of the shaft 13a thereby permitting the washer 35 and the segment 43a to be slipped from the shaft and reassembled with the segment in a reverse position.

I claim:

1. In a self-starting motor having a motor shaft, a device for insuring unidirectional rotation of the shaft comprising, in combination, two meshing pinion gears adapted to be rotatably driven by said motor shaft, a gear segment rotatably mounted concentrically with one of said pinions and adapted to rotate into meshing engagement with the other of said pinions, and means interconnecting said segment and the pinion concentric therewith for causing the latter to rotate the segment in either direction, said connection permitting limited relative rotation between said segment and the connected pinion so that upon rotation in one direction the gear teeth of the pinion and the connected segment are in axial alinement while upon rotation in the opposite direction the teeth are axially misalined.

2. In a self-starting motor having a motor shaft, a device for insuring unidirectional rotation of the shaft comprising, in combination, two meshing pinion gears adapted to be rotatably driven by said motor shaft, a gear segment rotatably mounted concentrically with one of said pinions and adapted to rotate into meshing engagement with the other of said pinions, a pin and slot connection between said segment and the pinion concentric therewith permitting the latter to rotate the segment, said slot permitting limited relative rotation between said segment and the connected pinion so that upon rotation in one direction the gear teeth of the pinion and the connected segment are in axial alinement while upon rotation in the opposite direction the teeth are axially misalined.

3. In a self-starting motor having a motor shaft, a device for insuring unidirectional rotation of the shaft comprising, in combination, two meshing pinion gears adapted to be rotatably driven by said motor shaft, a gear segment rotatably mounted concentrically with one of said pinions and adapted to rotate into meshing engagement with the other of said pinions, and means interconnecting said segment and the pinion concentric therewith for causing the latter to rotate the segment in either direction, said connection permitting limited angular lost motion between said segment and the connected pinion equal to a distance of one and a half times the width of a gear tooth on the segment so that upon rotation in one direction, the gear teeth of the pinion and the connected segment are in axial alinement while upon rotation in the opposite direction the sets of teeth are intermediate one another.

4. A rotation controlling device for insuring unidirectional rotation of a motor shaft comprising, in combination, a pinion adapted to be driven by the motor shaft, a rotatable idler gear in meshing engagement with said pinion, a gear segment rotatably mounted concentrically with said pinion adapted for meshing engagement with said idler gear, and means connecting said pinion and said segment for causing the pinion to rotate the segment in either direction, said connection permitting limited relative movement between the pinion and the segment so that upon rotation in one direction the gear teeth of the pinion and segment are in axial alinement while upon rotation in the opposite direction the teeth are axially misalined.

5. A rotation controlling device for insuring unidirectional rotation of a motor shaft comprising, in combination, a pinion adapted to be driven by the motor shaft, a rotatable idler gear in meshing engagement with said pinion, a gear segment rotatably mounted concentrically with said pinion adapted for meshing engagement with said idler gear, a pin and slot connection between said pinion and said segment for causing the pinion to rotate the segment, said slot permitting limited relative movement between the pinion and the segment so that upon rotation in one direction the gear teeth of the pinion and segment are in axial alinement while upon rotation in the opposite direction the teeth are axially misalined.

6. In a self starting motor having a motor shaft, a device for insuring unidirectional rotation of said shaft comprising, in combination, a pinion secured for rotation to said shaft, a rotatable idler gear in meshing engagement with said pinion, a gear segment adapted for meshing engagement with said idler gear loosely supported on said shaft for free rotation relative thereto, said segment being frictionally restrained against rotation under the influence of said motor shaft, and means connecting said pinion and said segment for causing the pinion to rotate the segment in either direction, said connection permitting limited relative movement between the pin and the segment so that upon rotation in one direction the gear teeth of the pinion and segment are in axial alinement while upon rotation in the opposite direction the teeth are axially misalined.

7. In a self starting motor having a motor shaft, a device for insuring unidirectional rotation of said shaft comprising, in combination, a pinion secured for rotation to said shaft, a rotatable idler gear in meshing engagement with said pinion, a gear segment adapted for meshing engagement with said idler gear loosely supported on said shaft for free rotation relative thereto, said segment being frictionally restrained against rotation under the influence of said motor shaft, and a pin and slot connection between said segment and the pinion concentric therewith for causing the latter to rotate the segment, said slot permitting limited relative movement between the pin and the segment so that upon rotation in one direction the gear teeth of the pinion and segment are in axial alinement while upon rotation in the opposite direction the teeth are axially misalined.

8. In a self starting motor having a motor shaft, a device for insuring unidirectional rotation of said shaft comprising, in combination, a pinion secured for rotation to said shaft, a rotatable idler gear in meshing engagement with said pinion, a gear segment adapted for meshing engagement wtih said idler gear loosely and removably supported on said shaft for free rotation relative thereto, said segment being frictionally restrained against rotation under the influence of said motor shaft, and a pin and slot connection between said segment and the pinion concentric therewith for causing the latter to rotate the segment, said slot permitting limited relative movement between the pin and the segment so that upon rotation in one direction the gear teeth of the pinion and segment gear teeth are in axial alinement while upon rotation in the opposite direction the teeth are axially misalined, said removable segment permitting reversal of the segment on said shaft so as to reverse the rotational direction in which the gear teeth of the pinion and the segment are in alinement.

References Cited in the file of this patent

UNITED STATES PATENTS

| 2,090,357 | Regan | Aug. 17, 1937 |
| 2,436,231 | Schellens | Feb. 17, 1948 |

FOREIGN PATENTS

| 758,514 | Great Britain | Oct. 3, 1956 |